Dec. 6, 1960 R. J. DAPP 2,963,142
APPARATUS AND METHOD FOR ARTICLE CONVEYING AND DISTRIBUTING
Filed Sept. 18, 1958 4 Sheets-Sheet 1
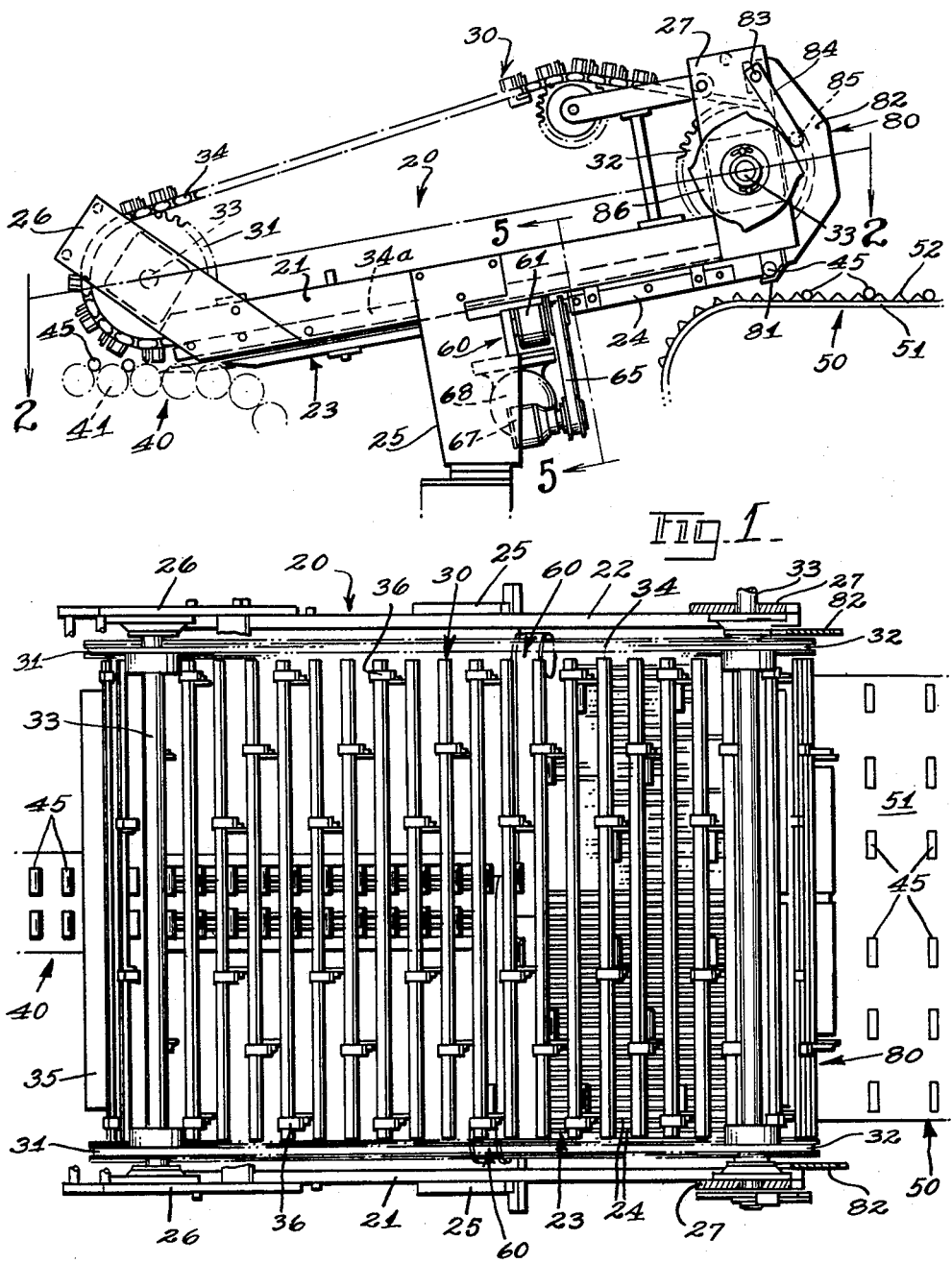
INVENTOR.
ROBERT J. DAPP
BY
ATTORNEYS Dec. 6, 1960                    R. J. DAPP                    2,963,142
        APPARATUS AND METHOD FOR ARTICLE CONVEYING AND DISTRIBUTING
Filed Sept. 18, 1958                                    4 Sheets-Sheet 2
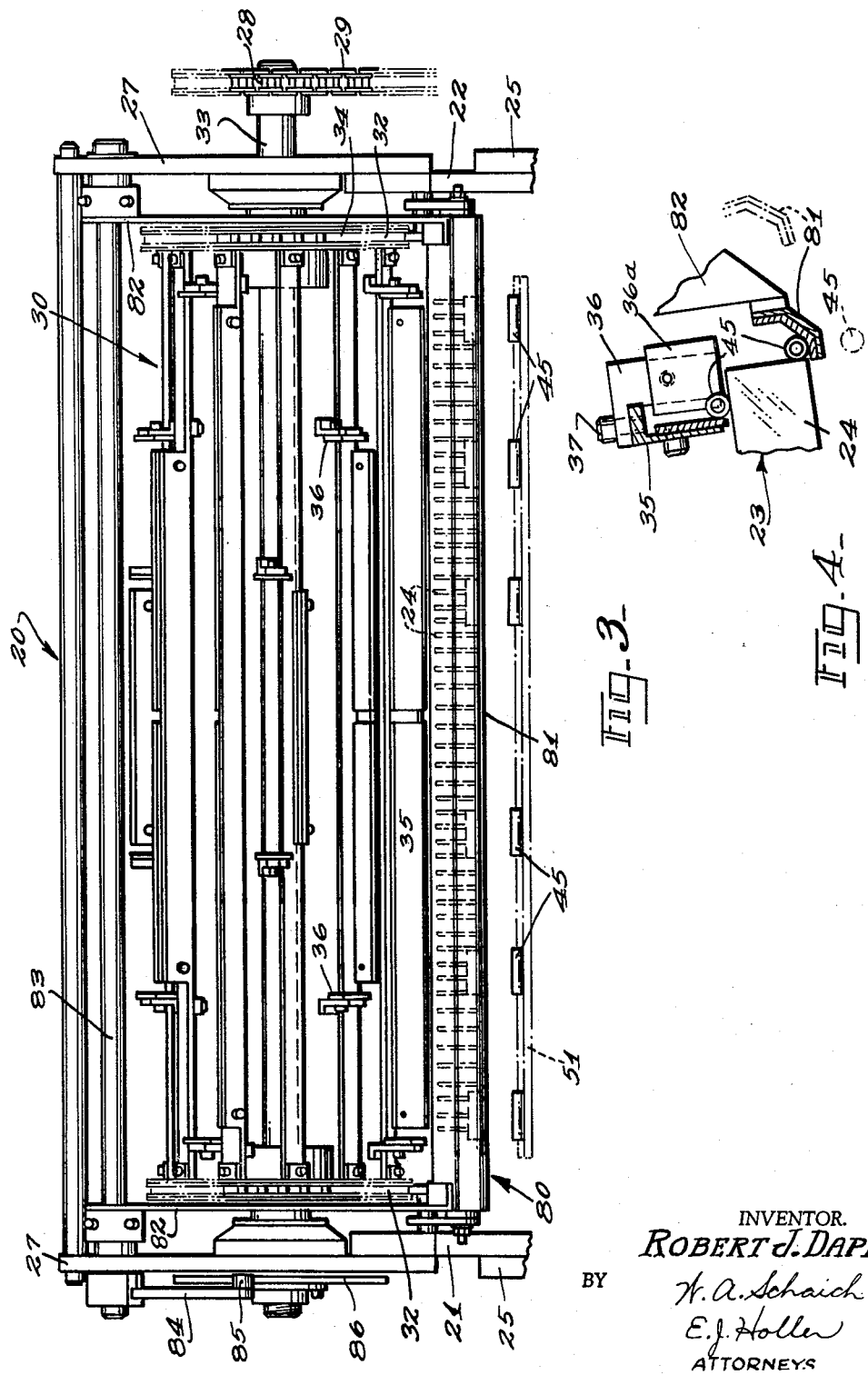
INVENTOR.
ROBERT J. DAPP
BY
W. A. Schaich &
E. J. Holler
ATTORNEYS

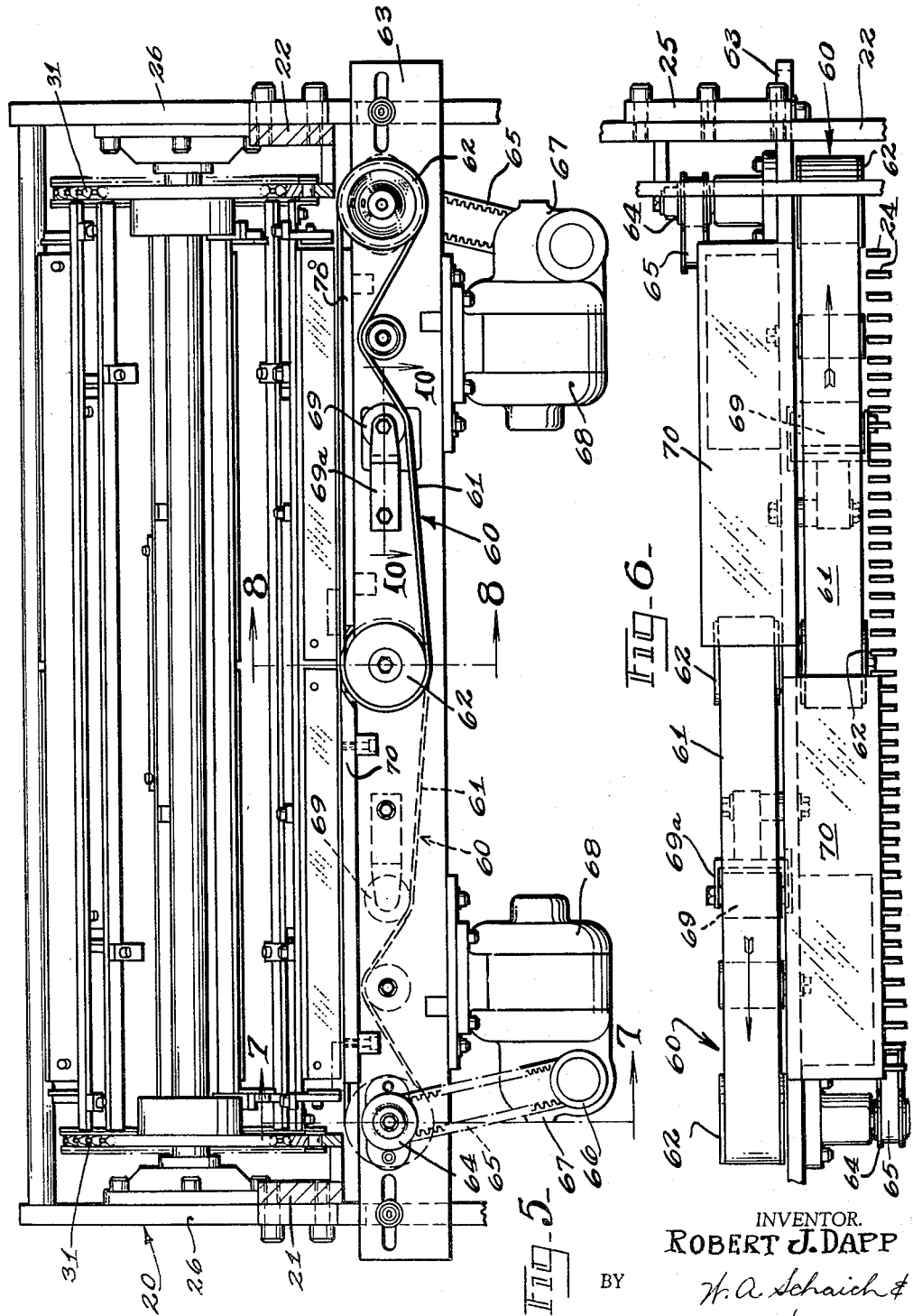

Dec. 6, 1960 R. J. DAPP 2,963,142
APPARATUS AND METHOD FOR ARTICLE CONVEYING AND DISTRIBUTING
Filed Sept. 18, 1958 4 Sheets-Sheet 4
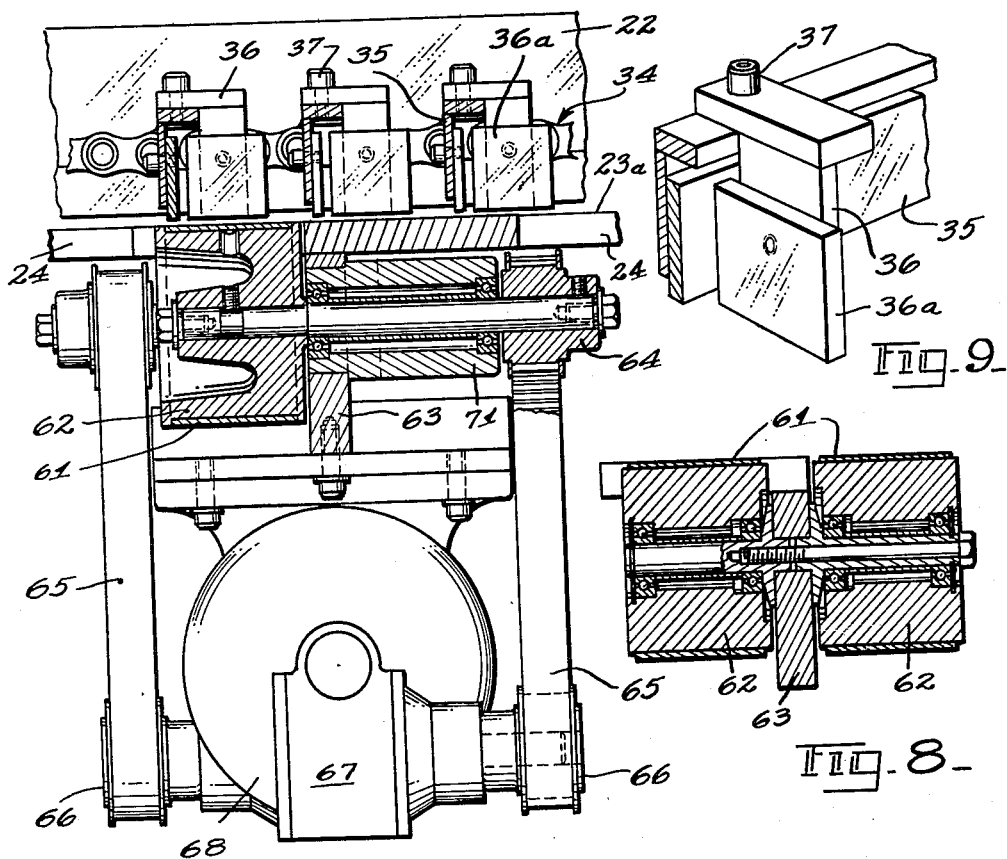
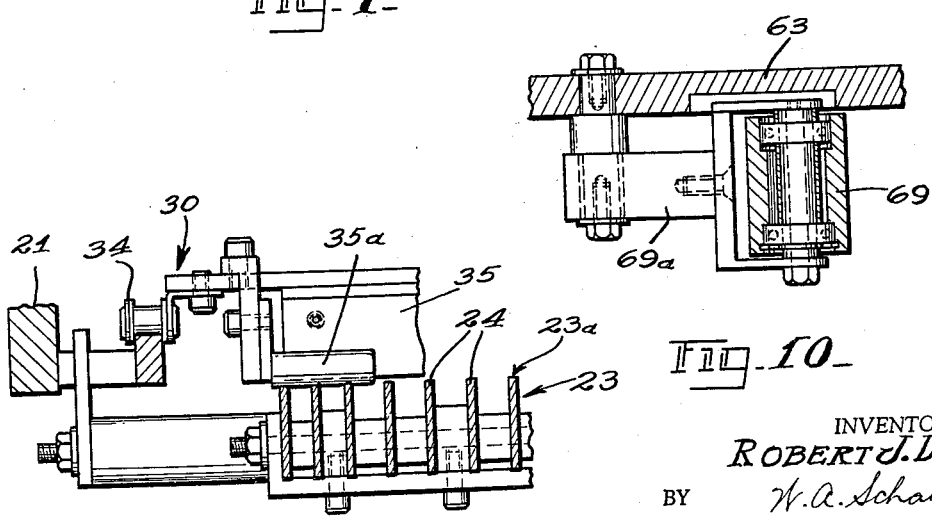
INVENTOR.
ROBERT J. DAPP
BY W. A. Schaich &
E. J. Holler
ATTORNEYS United States Patent Office 2,963,142
Patented Dec. 6, 1960

2,963,142

APPARATUS AND METHOD FOR ARTICLE CONVEYING AND DISTRIBUTING

Robert J. Dapp, Vineland, N.J., assignor to Kimble Glass Company, a corporation of Ohio Filed Sept. 18, 1958, Ser. No. 761,831

11 Claims. (Cl. 198—30)

This invention relates to article conveying and distributing apparatus and the method of effecting changes in distribution and elevation of a successive series of articles being transported. The invention more particularly relates to a combination of inclinedly and laterally travelling endless belt conveyors for effecting desired re-distribution and re-elevation of successive articles transferred from one location to another.

In many fields and particularly in the small glass container industry such as the manufacture of small glass vials, ampuls, bottles, syringe cartridges, and the like, it is frequently necessary to convey successive series of articles from one distribution pattern to another and from one elevation to another. One example in this field is from a continuous bottoming operation where successive tubular glass blanks are each separated in a medial area into two similar articles during their conveyance and are then transferred to a wide-belt annealing lehr for subsequent heat treatment.

In the glass container industry and especially in the production of small glass containers ranging in size from a few cubic centimeters to several ounces, it is highly desirable that a continuous conveyor be utilized to effect movement of such small containers from apparatus which performs a final shaping operation of successive articles in narrow orientation to a slowly moving wide screen of an annealing lehr in widely distributed orientation. Furthermore, it is common in practice that the conveying path does not lie in a horizontal plane and considerable difficulty has been encountered in adapting known forms of conveyors to wide ranges of sizes and shapes wherein successive pairs of similar articles may be given wide-spread uniform distribution. In many factory layouts it is frequently necessary to alter the elevation and distribution of the articles during their transfer to and from existing equipment to facilitate their expeditious automatic movement therebetween. Also it is necessary that the glass articles be conveyed from one orientation pattern to another and from one elevation to another without bumping adjacent articles together thereby eliminating the risks of producing chipping or breakage of the articles. In handling small sizes of successively formed articles, manual transfer involving high labor costs is objectionable and prohibitive due to the low unit cost of the articles and the great volumes of production necessary in economical manufacturing processes. This is especially true in producing small glass containers such as for medical or pharmaceutical use.

Accordingly, it is an object of this invention to provide improved article conveying and distributing apparatus for changing both the elevation and orientation of successive conveyed articles wherein the articles handled in any particular series are substantially alike in size and configuration.

Another object of this invention is to provide improved conveying and distributing apparatus consisting of combined forwardly and laterally travelling endless belt-type conveyors adapted to receive successive articles in one orientation and to deliver the articles in more widely distributed orientation at another elevation.

Another object of this invention is to provide an improved conveyor structure for re-orientation and re-elevation of successive pairs of conveyed tubular articles into more widespread arrangement, the apparatus being characterized by the provision of means effecting the rapid and convenient adjustment of the apparatus to conform to the particular size of the articles being conveyed and their desired rearrangement on another conveying surface.

Another object of this invention is to provide an improved conveyor structure for effecting changes in orientation and elevation of successive continuously transported glass articles wherein the articles are conveyed in such manner as to eliminate the possibility of jostling or bumping together of successive articles and to secure a positive realignment of a plurality of the articles on another moving surface.

A further object of this invention is to provide article handling mechanism adapted to re-arranging and re-distributing successively conveyed tubular glass articles which mechanism is positive in its action and furnishes desired re-orientation of the articles in coaxially aligned plural arrangement on a moving surface.

A still further object of this invention is to provide an improved method of article handling wherein successive articles of similar size and shape are transported in pairs and re-distributed so that a greater number of the articles is aligned in coaxial positions in different orientation on a moving surface for subsequent operations thereupon.

The specific nature of this invention as well as other objects and advantages thereof, will become apparent to those skilled in the art from the following detailed description, taken in conjunction with the annexed sheet of drawings on which there is shown, by way of preferred example only, one embodiment of this invention.

On the accompanying drawings:

Fig. 1 is a side elevational view of the subject conveying and distributing apparatus embodying this invention.

Fig. 2 is a plan view partially in section taken along the line 2—2 of Fig. 1 showing the primary overhead conveyor of the subject apparatus.

Fig. 3 is an elevational view of the discharge end of the apparatus.

Fig. 4 is a fragmentary enlarged vertical sectional view of the discharge end of the apparatus shown in Fig. 1.

Fig. 5 is an enlarged vertical sectional view taken along the line 5—5 of Fig. 1 showing a pair of transverse conveyors of the apparatus.

Fig. 6 is a fragmentary enlarged top plan view of the transverse conveyors of the apparatus.

Fig. 7 is a further enlarged vertical sectional view taken along the line 7—7 of Fig. 5 showing one side of the transverse conveyors shown in Figs. 5 and 6.

Fig. 8 is a vertical sectional view taken along the line 8—8 of Fig. 5 showing the coaxially disposed receiving end portions of the transverse conveyors.

Fig. 9 is a perspective view of an individual stop on one cross member of the primary conveyor as shown in plurality in Figs. 2 and 7.

Fig. 10 is a fragmentary horizontal sectional view taken along the line 10—10 of Fig. 5 showing an idler roll of one transverse conveyor.

Fig. 11 is a fragmentary vertical sectional view of a side portion of the apparatus showing the primary overhead conveyor and stationary table.

The apparatus embodying this invention is particularly utilizable for effecting changes in distribution and elevation of successive series of similar conveyed articles such as small tubular glass containers. A conventional apparatus of any well-known type may be employed to effect transfer of such articles continuously into the input end of the subject distributing apparatus and to convey the articles from the output end of the apparatus. Since such cooperating apparatus is entirely conventional and well known in the art, it has not been described or illustrated in detail.

This invention relates to article handling mechanism which is adapted to rolling successive pairs of tubular articles in adjacent parallel relationship with each pair in essentially coaxial alignment over a stationary inclined table by engageable contact of an overhead conveyor and during forward movement of the articles to effect simultaneous lateral movement to separate the articles into staggered repeating groups which are collected in plural series in coaxial alignment by an accumulating device and are deposited onto a moving surface in a reoriented pattern in synchronism with their forward and transverse movements.

A distributing conveyor embodying the subject invention is illustrated generally by the numeral 20 and comprises a pair of frame structures 21 and 22. Frame structures 21 and 22 comprise upright sides within which is mounted an inclined stationary table 23. The table is formed essentially of a spaced-apart series of elongated parallel strips or bars 24 which may be composed of heat-resistant material. Strips 24 extend throughout the length of table 23 from its receiving to discharging ends to furnish a plane top surface 23a.

The upright side structures 21 and 22 and table 23 are supported by several depending stationary legs 25 which extend upwardly from a base. Table 23 is shown in a prescribed inclined position in Fig. 1 although it is adjustable from horizontal to various angles of elevation as desired by changing the position of attachment of supporting legs 25.

Upright members 26 and 27 are affixed to opposite ends of frame structures 21 and 22. Members 26 and 27 are arranged in pairs in opposing relation at the receiving and discharge ends respectively of table 23 extending upwardly therefrom.

An endless belt type conveyor 30 is mounted within and upon the four upright members 26 and 27 (Figs. 1 and 2). A shaft 33 is journaled within each pair of upright members 26 and 27 for rotary movement. Each shaft 33 has a pair of similar sprockets 31 and 32 mounted thereon within upright members 26 and 27 respectively. Endless belt 34 is trained around each pair of aligned sprockets 31 and 32 and comprises a horizontally or inclinedly travelling lower reach extending over and above table 23. Thus, overhead conveyor 30 constitutes the primary apparatus for moving the articles forwardly over stationary table 23.

Endless belt 34 as illustrated defines a generally inclinedly extending lower flight 34a which is disposed in substantially parallel alignment with table 23. Lower flight or reach 34a of endless belt 34 extends coextensively with the stationary table between input and output ends of the apparatus.

Primary overhead conveyor 30 is driven at one end such as at its discharge end by shaft 33 extending outwardly beyond upright member 27 with a driving sprocket 28 and drive chain 29 mounted thereon (Fig. 3) extending to the output end of a motor (not shown).

Belt 34 has an equi-spaced series of parallel elongated cross members 35 extending throughout its endless length, each individual member 35 being of sufficient length to extend throughout the width of table 23 normal to the primary direction of travel of the conveyed articles. Each cross member 35 has a pair of spaced-apart stop members 36 affixed to a leading edge portion thereof. Each stop member 36 has a restraining surface 36a normal to cross members 35.

The ends of table 23 and the lower reach 34a of overhead conveyor 30 extend from a conventional conveyor 40 to a moving surface such as the receiving end of an annealing or decorating lehr 50 (Figs. 1 and 2).

Conveyor 40 has a series of rolls 41 upon which are conveyed successive pairs of newly-formed articles 45 such as glass vials in coaxial alignment in recumbent positions to be engaged by the lower reach 34a of overhead primary conveyor 30 and transported over table 23. The discharge end of table 23 extends upwardly over the receiving end of lehr 50. Lehr 50 has a continuously moving endless belt 51 having a uniform series of spacing ribs 52 on its upper surface for reception and retention of articles 45. The lengthy spaced strips 24 which comprise table 23 are arranged with their receiving ends slightly below independent conveyor rolls 41 and their discharge ends disposed over and above lehr belt 51. It is to be fully understood that conventional conveyor 40 and lehr 50 may be varied widely as desired by substituting other cooperating apparatus therefor.

Articles 45 are received on the input end of table 23 and rolled over its upper surface 23a by elongated cross members 35 contacting their sides as shown in Figs. 1 and 2. Articles 45 are received in coaxially-aligned recumbent positions and moved in a lineal direction. The spacing of cross members 35 may be essentially equivalent to the spacing of articles 45 as received. However, this is no limitation since the lineal speed of conveyor 30 may be regulated so that the cross members, having a different spacing from the articles as received, each receive a pair of articles 45 to be moved forwardly along the medial region of table 23.

Each cross member 35 may have either a planar article engaging vertical surface or preferably may be V-shaped being angled rearwardly slightly from its central area. The spaced support strips 24 of table 23 and the leading edges of cross members 35 may consist of heat-resistant material to facilitate the conveyance of newly-formed articles containing a considerable amount of residual heat from a forming operation such as a twin-botoming procedure where a pair of similar articles 45 are fabricated from a single tubular glass blank.

Cross members 35 each have a pair of stop members 36 affixed thereto an equal distance from the central axis of table 23. The inner surfaces 36a of stop members 36 serve to limit lateral movement of an individual pair of conveyed articles 45 during one phase of their forward movement over table surface 23a. Each stop member 36 is connected to conveyor cross member 35 by a machine bolt 37 and is adapted to adjustable mounting thereupon through wide limits from a central region to a peripheral side portion of table 23. The ends of cross members 35 are held above table top 23a by connecting slide bars or rollers 35a located to move over side portions of the table (Fig. 11).

As shown in Figs. 2, 5 and 6 a pair of transverse conveyors 60 extend from a medial region of table 23 toward generally opposing side portions. Each conveyor 60 has its upper reach or stretch essentially coplanar with table top 23a. The upper reaches of the twin transverse conveyors 60 are operable in opposite directions away from the table axis normal to the direction of travel of lower reach 34a of overhead primary conveyor 30.

As shown in Figs. 5 and 6 each transverse conveyor belt 61 extends from a coaxial central region of the table toward peripheral side areas with each belt 61 trained around a pair of similar pulleys 62. Each pulley 62 mounted on an outer extremity of frame member 63 (Fig. 5) is utilized as the driving pulley being mounted on a rotary shaft which is in turn driven by a pulley 64 (Fig. 7). Pulley 64 is driven by a belt 65 connected to an output pulley 66 of a speed reducing unit 67 which is connected in turn to a motor 68. Each belt 61 has an idler roll 69 mounted on frame member 63 by a pivoted resilient arm 69a adapted to maintain proper tension in the belt.

The pair of transverse conveyors 60 are mounted with their receiving end pulleys 62 coaxial with the central axis of the table 23 (Fig. 8). Belts 61 of the twin conveyors 60 are adapted to be operable normal to the primary overhead conveyor 30 at generally the same lineal speed in opposite directions so that each article 45 received on its input end may be carried laterally from a medial to a peripheral side region of table 23 simultaneously with its forward movement effected by the lower flight 34a of primary conveyor 30. Each conveyor 60 has a flat plate 70 disposed in alignment therewith comprising a portion of planar table top 23a.

An accumulating device 80 (Figs. 1, 2 and 3) is located at the discharge end of table 23 having a collection bar 81 extending coextensively with the table width immediately below the termination of parallel strips 24. Collection bar 81 is supported at its ends by two pivotally mounted upright members 82 which are connected to a pivotal shaft 83 journaled within upright members 27. As shown in Figs. 1 and 3, one outer end of shaft 83 has a lever arm 84 connected thereto having a cam roller 85 attached to its free end. Cam roller 85 follows the contour of cam 86 which is connected to one end of drive shaft 33 of the overhead conveyor 30. Cam 86 has a contour adapted to keep collection bar 81 normally in its closed position beneath the discharge end of table 23 and to facilitate its sequential opening. Collection bar 81 in its closed position is adapted to receive and temporarily retain articles 45 in an elevated position for a sufficient period to collect a single staggered flight of articles 45 from three cross members 35 such as the six containers illustrated in Fig. 3. Immediately following the collection of a single flight of six articles 45 cam 86 is rotated by shaft 33 to such a position that one of its crowns actuates lever arm 84 and opens collection bar 81 to allow the plurality of articles 45 to fall by gravity onto the moving surface 51 of lehr 50. The alternating positions of collection bar 81 are shown in full and broken lines in Fig. 4 which illustrates the passage of the articles over the termination of bars 24 into temporarily restrained arrangement for subsequent deposition onto a moving surface.

Operation of the apparatus which has not been apparent from the structural elements herein above described may be summarized as follows:

The pairs of articles 45 are taken from conventional conveyor 40 and rolled over the input end of table 23 by the cross members 35 of overhead conveyor 30. The pairs of articles are rolled along the upper surface of the table in coaxially aligned relation to an intermediate central area of the table where the pair of transverse conveyors 60 are located. Each article 45 which is rolled forwardly over the input end of transverse conveyor 60 is carried laterally across the table top to contact a stop member 36 spaced outwardly from the central region of the table. Each pair of articles 45 are moved apart an equivalent distance from the table axis. The pairs of stop members 36 on successive cross members 35 are arranged in alternating staggered relationship to form a repeating series of three prescribed positions as shown in Fig. 2. Articles 45 during their further forward movement are carried in repeating flights maintained in positive alignment against stop member surfaces 36a by the rearwardly inclined leading edges of cross members 35. Articles 45 are carried forwardly over the remaining portion of table 23 to arrive at its discharge end where they are collected in a plural series of six aligned articles temporarily retained within collection bar 81. Upon collection of each individual flight of six articles the collection bar automatically opens and deposits the articles on moving surface 51 as shown in Figs. 1, 2 and 3. Articles 45 may be given any prescribed orientation upon moving belt 51 depending upon its speed and the relative speed of conveyor 30 and the synchronized opening of accumulating device 80.

Obviously, a greater or lesser number of adjacent cross members of the primary conveyor may be employed to form a flight both to convey and space the pairs of articles in widely varied rearrangement.

Various other modifications may be resorted to within the spirit and scope of the appended claims.

I claim:

1. In combination, apparatus for transferring successive articles in series from one orientation pattern to another and from one elevation to another, comprising a frame structure having a bed plane for moving said articles over its upper surface, primary endless belt conveyor means mounted on said frame structure having a lower reach extending adjacent to and coextensive with said bed plane, a plurality of movable elongated cross members in parallel relationship spaced along the said primary conveyor means adapted to engage the conveyed articles, each of said cross members having at least one stop member affixed to a leading edge portion thereof, a pair of secondary endless belt conveyors having receiving ends disposed within a medial area of said bed plane, said secondary conveyors extending normal to the direction of travel of said primary conveyor means and having upper reaches disposed essentially coplanar with said bed plane, means adapted to operate the upper reaches of said pair of secondary conveyors in opposite directions toward the sides of said bed plane, accumulating means disposed at the discharge end of said bed plane adapted to retain the conveyed articles in rearranged sequence, and discharge means operable in synchronism with said primary conveyor means arranged to deliver the said articles from said accumulating means in a reoriented pattern.

2. The combined apparatus in accordance with claim 1, wherein said pair of secondary endless belt conveyors are disposed in near relationship extending from an axial region toward opposing side portions of said bed plane.

3. The combined apparatus in accordance with claim 1, wherein the upper reaches of said pair of secondary endless belt conveyors are essentially equi-dimensional and adapted to convey each of said articles laterally into contact with an individual stop member during its simultaneous forward movement effected by said primary conveyor means.

4. The combined apparatus in accordance with claim 1, wherein two stop members are arranged on each individual elongated cross member of said primary conveyor means in equi-distant relationship from an axial region of said bed plane, the said stop members being arranged in repeating step-wise relation on alternating cross members.

5. The combined apparatus in accordance with claim 1, wherein the said bed plane is rectangular and upwardly inclined from article receiving to discharging ends.

6. The combined apparatus in accordance with claim 1, wherein the upper reach of each of said secondary conveyors is of sufficient dimensions to transport an individual article laterally from a central region to an outer region of said bed plane during its forward movement effected by said primary conveyor means.

7. The combined apparatus in accordance with claim 1, wherein said accumulating means at the discharge end of said bed plane comprises a collection bar mounted perpendicular to the primary line of travel of said articles and coextensive with the width of said bed plane adapted to reciprocal operation by said discharge means for delivery of the said conveyed articles therefrom onto a moving surface in a reoriented pattern.

8. In combination, apparatus for transferring successive pairs of tubular articles in series from one orientation pattern to another and from one elevation to another, where all articles transferred in any particular series are of the same size, comprising a frame structure having a flat inclined bed plane for moving said articles thereover, primary endless belt conveyor means mounted on said frame structure extending over and coextensive with said bed plane, a plurality of movable elongated cross members in parallel relationship spaced along said primary conveyor means and defining a lower reach essentially parallel to said bed plane, each of said conveyor cross members having a pair of stop members affixed thereto, said stop members being arranged on alternating cross members in repeating stepwise relationship, a pair of secondary endless belt conveyors extending transversely from a medial region to opposing side portions of said bed plane with their upper reaches coplanar therewith, said upper reaches of secondary conveyors adapted to lateral movement in opposite directions perpendicular to the direction of travel of the lower reach of said primary conveyor means, an accumulating member disposed at the discharge end of said bed plane to receive and retain a sequential series of conveyed articles, and discharge means mounted on said frame structure interconnecting said accumulating member and said primary conveyor means for operation in synchronism therewith to deliver the articles from said accumulating member onto a moving surface in a reoriented pattern.

9. The combined apparatus in accordance with claim 8, wherein said discharge means comprises a rotary cam and lever arm joining one end of said primary conveyor means and said accumulating member for collecting and delivering said sequential series of articles from a plurality of said conveyor cross members.

10. The combined apparatus in accordance with claim 8, wherein said pairs of stop members on an individual cross member are spaced essentially equi-distant from the axis of said bed plane and are disposed across the width of said bed plane in repeating relationship on alternating cross members.

11. Apparatus for transferring successive articles from one orientation pattern to another comprising a frame structure having a stationary bed plane for moving said articles over its upper surface, primary conveyor means mounted on said frame structure having a lower reach extending adjacent to and at least partially coextensive with said bed plane, a plurality of elongated cross members mounted transversely on said primary conveyor means adapted to engage the conveyed articles, each of said cross members having at least one stop member affixed to a leading edge portion thereof, a pair of secondary endless belt conveyors disposed essentially coplanar with said bed plane and extending normal to the direction of travel of said primary conveyor means, said secondary conveyors having their receiving ends disposed within a medial region of said bed plane, means adapted to move the upper reaches of said pair of secondary conveyors in opposite directions toward opposing sides of said bed plane, accumulating means disposed at the discharge end of said bed plane adapted to gather the conveyed articles in rearranged order, and discharge means operable in synchronism with said primary conveyor means adapted to deliver the said articles from said accumulating means in a reoriented pattern.

References Cited in the file of this patent
UNITED STATES PATENTS

| | | |
|---|---|---|
| 1,890,740 | Marasso | Dec. 13, 1932 |

FOREIGN PATENTS

| | | |
|---|---|---|
| 387,862 | Germany | Feb. 16, 1933 |